United States Patent
Hasegawa

(10) Patent No.: US 9,232,152 B2
(45) Date of Patent: Jan. 5, 2016

(54) IMAGE CAPTURING APPARATUS AND CONTROL METHOD THEREOF FOR CORRECTING EXPOSURE UNEVENNESS CAUSED BY AN EXTERNAL LIGHT CHANGE

(71) Applicant: CANON KABUSHIKI KAISHA, Tokyo (JP)

(72) Inventor: Reiji Hasegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/314,988

(22) Filed: Jun. 25, 2014

(65) Prior Publication Data
US 2015/0002694 A1    Jan. 1, 2015

(30) Foreign Application Priority Data
Jun. 26, 2013   (JP) .................. 2013-134206

(51) Int. Cl.
*H04N 5/911*   (2006.01)
*H04N 5/235*   (2006.01)

(52) U.S. Cl.
CPC .................. *H04N 5/2357* (2013.01)

(58) Field of Classification Search
CPC .................................... H04N 5/2357
USPC ....................................... 348/226.1
See application file for complete search history.

(56) References Cited

U.S. PATENT DOCUMENTS 6,781,713 B1 * 8/2004 Gilman et al. ............... 358/1.9
2010/0053369 A1 * 3/2010 Nagai ....................... 348/226.1

FOREIGN PATENT DOCUMENTS

JP    2004-193922 A    7/2004

* cited by examiner

*Primary Examiner* — Joel Fosselman
(74) *Attorney, Agent, or Firm* — Cowan, Liebowitz & Latman, P.C.

(57) ABSTRACT

An image capturing apparatus comprises an image capturing unit configured to capture an object image, a flicker detection unit configured to detect a flicker, a generation unit configured to generate a flicker image which is affected by the flicker or appears to be affected by the flicker from an image captured by the image capturing unit when the flicker detection unit detects the flicker, a display unit configured to display an image, and a control unit configured to control the display unit to display an image which is not affected by the flicker and the flicker image.

16 Claims, 10 Drawing Sheets

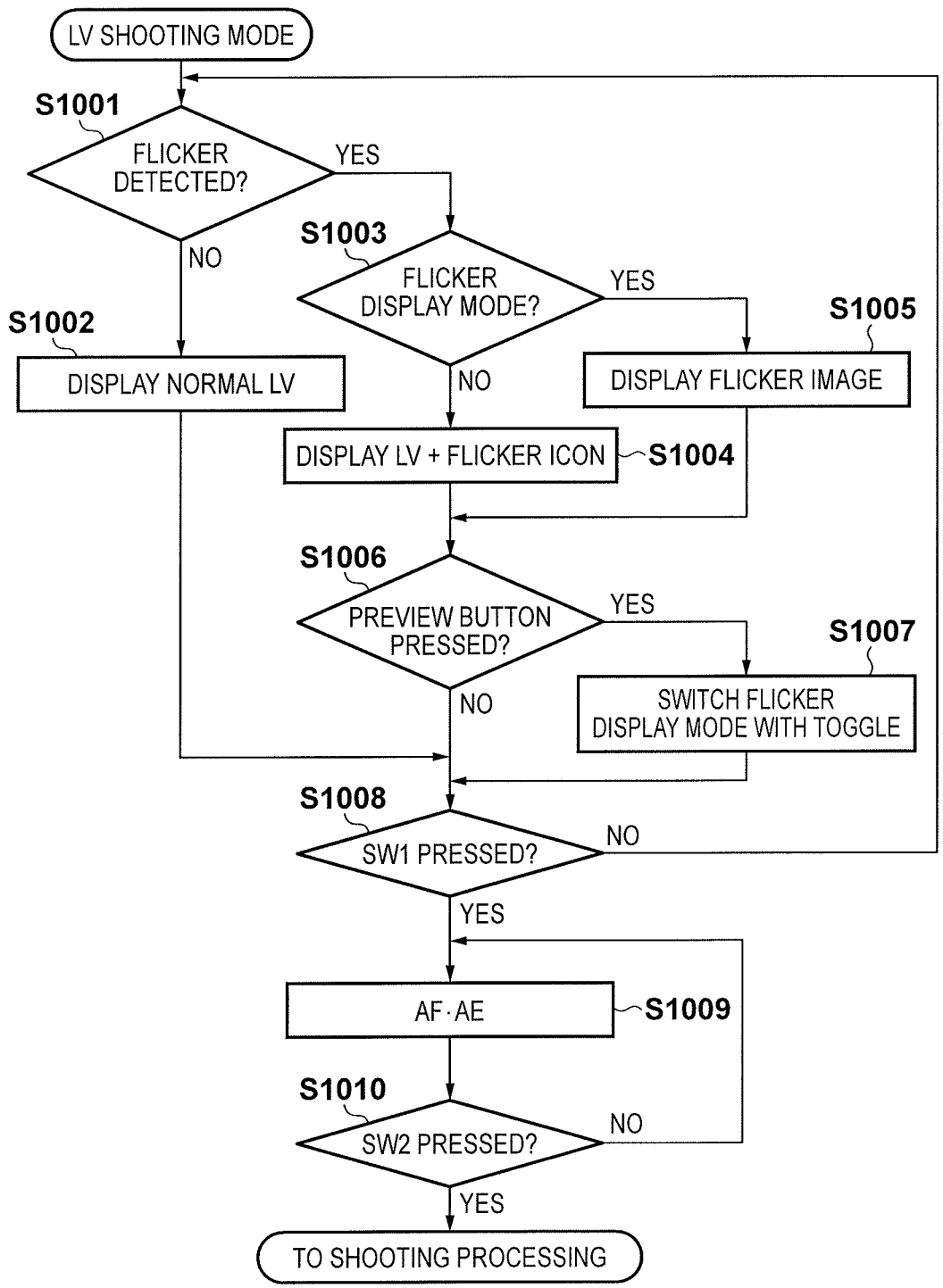

IMAGE CAPTURING APPARATUS AND CONTROL METHOD THEREOF FOR CORRECTING EXPOSURE UNEVENNESS CAUSED BY AN EXTERNAL LIGHT CHANGE

BACKGROUND OF THE INVENTION

1. Field of the Invention

The present invention relates to a technique of correcting exposure unevenness caused by an external light change (generally referred to as a flicker) which occurs in shooting in an image capturing apparatus such as a digital camera.

2. Description of the Related Art

Recently, along with the improvement of sensitivity of the image sensor of a digital camera, it is possible to shoot with a high-speed shutter (in a short exposure time) even under an artificial light source indoors or the like. When shooting with the high-speed shutter under a flicker light source, however, an external light change due to the flicker light source causes the variation in brightness for each frame in continuous shooting. Furthermore, in shooting with a so-called rolling shutter which sequentially exposes image capturing regions for each predetermined region, the external light change due to the flicker light source causes exposure unevenness within a screen.

In Japanese Patent Laid-Open No. 2004-193922, a technique of performing exposure at a timing with the largest light amount in a light emission cycle of a light source is proposed for this problem. According to this technique, since each shooting is performed at the timing with the largest light amount in the light emission cycle of the light source also in continuous shooting, the variation in brightness for each frame does not occur. Moreover, since the change in the light amount is small near the timing with the largest light amount in the light emission cycle, exposure unevenness within the screen can also be reduced.

In the related art disclosed in Japanese Patent Laid-Open No. 2004-193922 described above, however, since shooting is not performed at a user intended timing but is performed in accordance with the timing with the largest light amount in the light emission cycle of the light source, a photo opportunity may be missed. In some cases, the user may not want to miss the photo opportunity in spite of the occurrence of certain exposure unevenness or the like due to a flicker. However, the user cannot determine easily whether control to suppress an influence of the flicker or control not to miss the photo opportunity should be performed because information for deciding it is not available.

There is also a technique of correcting an image to an image with suppressed influence of the flicker by image processing after shooting. However, the variation in noise becomes conspicuous even though the variation in brightness or exposure unevenness is suppressed by correction. Also, in this case, the user cannot determine easily whether the control to suppress the influence of the flicker or control to make the variation in noise less conspicuous should be performed.

SUMMARY OF THE INVENTION

The present invention has been made to solve the above-described problems, and provides an image capturing apparatus capable of providing information for a user to determine whether control to suppress an influence of a flicker should be performed.

According to the first aspect of the present invention, the image capturing apparatus comprises an image capturing unit configured to capture an object image, a flicker detection unit configured to detect a flicker of illumination light which illuminates an object, a generation unit configured to generate a flicker image which is affected by the flicker or appears to be affected by the flicker from an image captured by the image capturing unit when the flicker detection unit detects the flicker, a display unit configured to display an image, and a control unit configured to control the display unit to display an image which is not affected by the flicker and the flicker image.

Furthermore, according to the second aspect of the present invention, a method of controlling an image capturing apparatus including an image capturing unit configured to capture an object image and a display unit configured to display an image, comprising: a flicker detection step of detecting a flicker of illumination light which illuminates an object; a generation step of generating a flicker image which is affected by the flicker or appears to be affected by the flicker from an image captured by the image capturing unit when the flicker is detected in the flicker detection step; and a control step of controlling the display unit to display an image which is not affected by the flicker and the flicker image.

Further features of the present invention will become apparent from the following description of exemplary embodiments with reference to the attached drawings.

BRIEF DESCRIPTION OF THE DRAWINGS

FIG. 9 is a flowchart showing the processing sequence of, for example, flicker detection, and flicker image display.

DESCRIPTION OF THE EMBODIMENTS

An embodiment of the present invention will now be described in detail with reference to the accompanying drawings.

(Apparatus Configuration)

Figure 1:
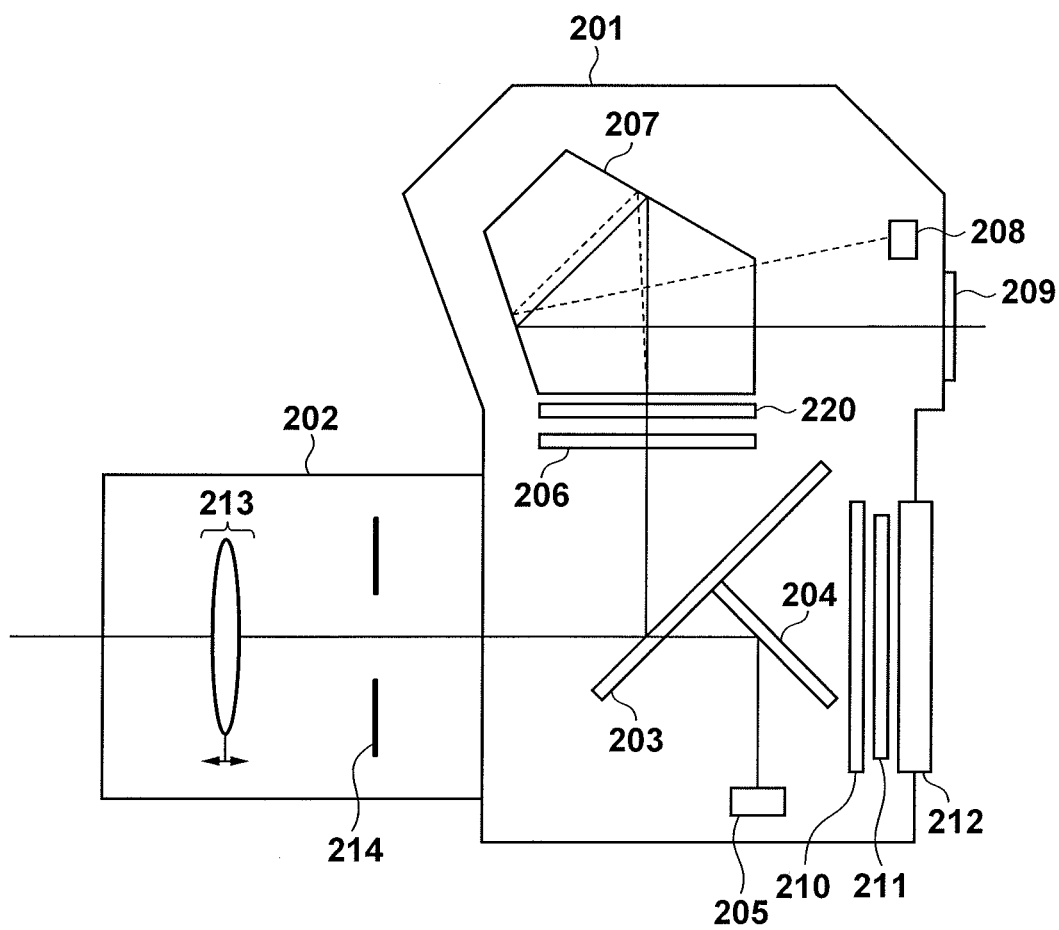
FIG. 1 is a side sectional view showing the configuration of a digital single-lens reflex camera serving as an image capturing apparatus according to one embodiment of the present invention.

FIG. 1 is a side sectional view showing the configuration of a digital single-lens reflex camera serving as an image capturing apparatus according to one embodiment of the present invention. In FIG. 1, a shooting lens 202 for forming an object image is mounted on the front surface of a digital single-lens reflex camera body (to be referred to as a camera hereinafter) 201. The shooting lens 202 is interchangeable, and the camera 201 and the shooting lens 202 are electrically connected via a mount contact group 215 (shown in FIG. 2). A focusing lens 213 and a stop 214 are arranged in the shooting lens 202. A light amount to be received within the camera is adjusted by control via the mount contact group 215, thereby enabling focus to be adjusted.

A main mirror 203 is a half mirror. The main mirror 203 is arranged obliquely on a shooting optical path in a viewfinder observation state. While a shooting light beam traveling from the shooting lens 202 is reflected to a viewfinder optical system, transmitted light is guided to an AF unit 205 via an auxiliary mirror 204.

The AF unit 205 is a unit for performing focus adjustment by a phase difference detection method. Since focus detection based on the phase difference detection method is a known technique, the description of detailed control will be omitted here. A focus adjustment state of the shooting lens 202 is detected by forming a secondary imaging plane of the shooting lens 202 on a line sensor for focus detection. The focusing lens 213 is driven based on the detection result, thereby performing automatic focus adjustment.

A mat surface 206 is arranged on the expected imaging plane of the shooting lens 202 including the viewfinder optical system. A viewfinder display element 220 is also arranged on the expected imaging plane of the shooting lens 202. This makes it possible to use an appropriate display method depending on the contents desired to be displayed. For example, a light-emitting diode (LED), an organic light-emitting diode (OLED), an organic EL, or a liquid crystal is used.

Reference numeral 207 denotes a pentaprism for changing the viewfinder optical path. Reference numeral 209 denotes an eyepiece through which a user observes the mat surface 206 and can confirm a shooting screen. The eyepiece 209 includes a diopter adjustment lens and another optical system (not shown).

An AE unit 208 detects the inside of a viewfinder screen by a photometry sensor 303 including a plurality of pixels to be described later and can obtain an output regarding an object luminance from each pixel output in order to observe the brightness of an object. In this embodiment, the photometry sensor can obtain a wider dynamic range at a low illuminance by performing addition as needed. In this embodiment, object recognition and tracking processing to be described later are performed using an image obtained here, while observing the brightness of the object by the AE unit 208.

Reference numeral 210 denotes a focal plane shutter; and 211, a main image sensor. In exposure, the main mirror 203 and the auxiliary mirror 204 retract from the shooting light beam, and the image sensor 211 is exposed by opening the focal plane shutter 210. In order to avoid confusion hereinafter, capturing by the image sensor 211 will be referred to as main capturing; and capturing by the AE unit 208, auxiliary capturing. Moreover, an image generated by main capturing will be referred to as a main image; and an image generated by auxiliary capturing, an auxiliary image. A display unit 212 displays shooting information and a shot image so that the user can confirm them.

The configuration of a camera without the viewfinder optical system such as the main mirror 203, the mat surface 206, the pentaprism 207, the AE unit 208, the eyepiece 209, and the viewfinder display element 220, and the main mirror 203 for guiding light to it is also possible. Also, in this case, the present invention can be implemented.

Figure 2:
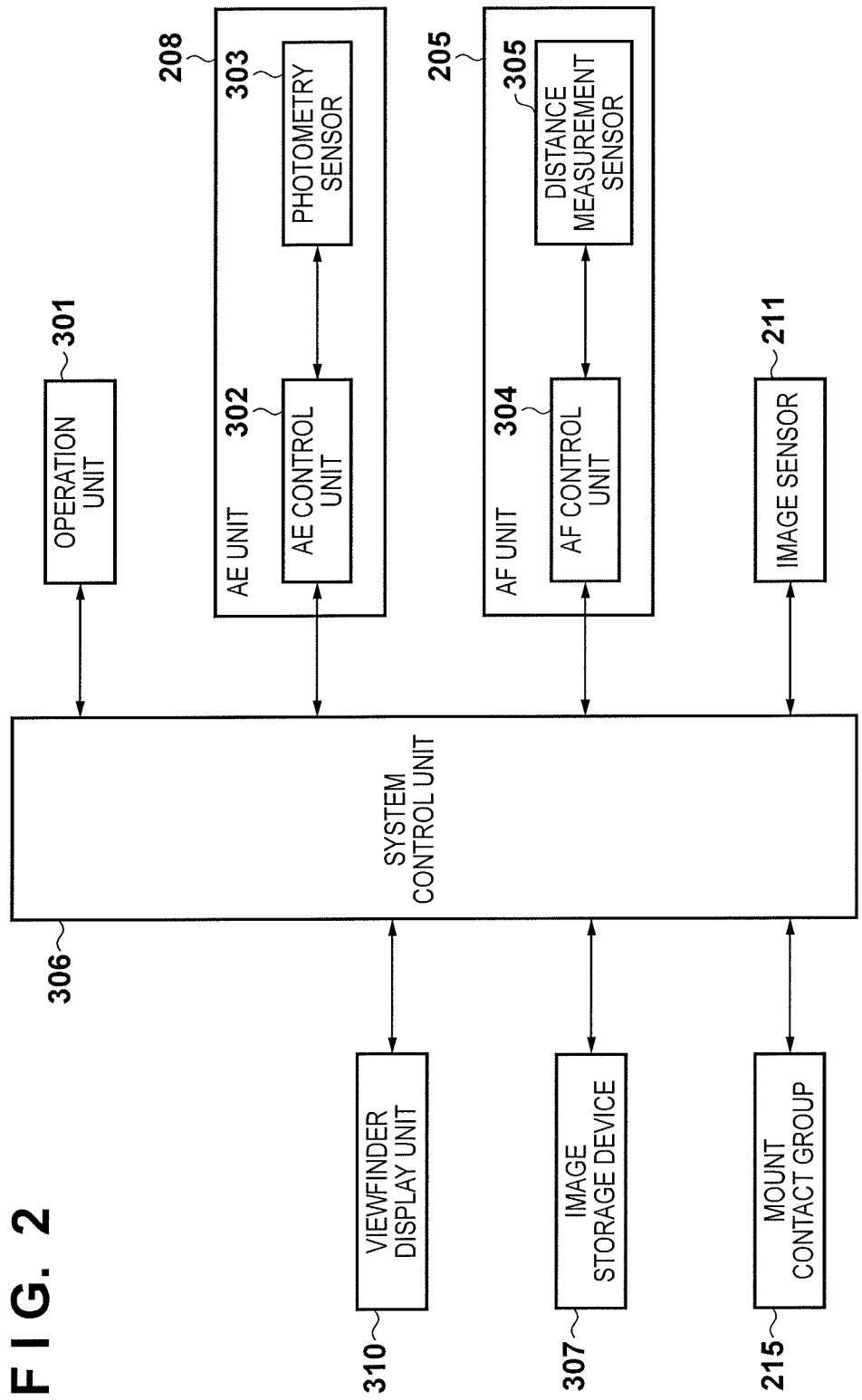
FIG. 2 is a block diagram showing the arrangement of the image capturing apparatus.

The function of the image capturing apparatus according to this embodiment will now be described with reference to a block diagram of FIG. 2. Note that the same reference numerals as in FIG. 1 denote the same parts.

An operation unit 301 detects operations performed by the user via a button, a switch, a dial, a connection device, or the like attached to the camera 201, and sends a signal corresponding to operation contents to a system control unit 306. Particularly, the operation unit 301 outputs, to the system control unit 306, an SW1 signal in response to a half-pressed release button and an SW2 signal in response to a full-pressed release button. A state in which the user holds the release button half-pressed will be referred to as an SW1 holding state; and a state in which the user holds the release button full-pressed, an SW2 holding state. Furthermore, the operation unit 301 outputs, to the system control unit 306, an SW1 cancel signal in response to the release of the release button by the user in the SW1 holding state; and an SW2 cancel signal, in the SW2 holding state.

The AF unit 205 performs automatic focus detection, and includes an AF control unit 304 and a distance measurement sensor 305. The distance measurement sensor 305 includes a pair of line sensors corresponding to a distance measurement point arrangement of a plurality of points, converts light entering via the auxiliary mirror 204 into an electric signal, and outputs an image signal to the AF control unit 304. The AF control unit 304 calculates a defocus amount of the measurement distance point corresponding to each line sensor and selects one measurement distance point for performing focus adjustment based on the image signal output from the distance measurement sensor 305. Then, the AF control unit 304 outputs, to the system control unit 306, a defocus map having the defocus amount of each measurement distance point as data and position information of the selected measurement distance point. The system control unit 306 performs focus adjustment calculation based on the selected measurement distance point position and the defocus map, and controls the focusing lens 213. A viewfinder display unit 310 includes the viewfinder display element 220. The viewfinder display unit 310 displays the measurement distance point decided by the AF unit 205, thereby informing the user of an object to which focus is adjusted currently.

The AE unit 208 performs automatic exposure calculation and object tracking, and includes an AE control unit 302 and the photometry sensor 303. The AE control unit 302 performs automatic exposure calculation based on photometry image data read from the photometry sensor 303 and outputs the result to the system control unit 306. The system control unit 306 controls an aperture amount of the stop 214 and adjusts an amount of light entering in the camera 201 based on the automatic exposure calculation result output from the AE control unit 302. In addition, the system control unit 306 controls the focal plane shutter 210 when releasing and adjusts an exposure time of the image sensor 211.

During the SW1 holding state and continuous shooting, the AE control unit 302 performs object tracking using the photometry image data obtained from the photometry sensor 303 and outputs object position data to the system control unit 306. The system control unit 306 outputs, to the AF control unit 304, the tracking target position data output from the AE control unit 302.

The system control unit 306 controls the main mirror 203, the auxiliary mirror 204, and the focal plane shutter 210 based on the signal output from the operation unit 301. If the signal output from the operation unit 301 is the SW2 signal, the main mirror 203 and the auxiliary mirror 204 are set to up positions and the focal plane shutter 210 is controlled to irradiate the image sensor 211 with light. Upon completion of shutter control, the main mirror 203 and the auxiliary mirror 204 are set to down positions.

The image sensor 211 converts light entering via the shooting lens 202 into the electrical signal to generate image data, and outputs it to the system control unit 306. The system control unit 306 displays the image data output from the image sensor 211 on the display unit 212 and writes it in an image storage device 307.

(Example of Flicker)

A flicker of illumination light of this embodiment and examples of the shot image which reflects the influence of the flicker will be described with reference to FIGS. 3A to 3D.

Assume a light source in which the flicker is occurring. Assume a state in which a fluorescent lamp or the like without an inverter flickers in a cycle of 50 Hz/60 Hz by an AC power source. Note that since the fluorescent lamp and an incandescent lamp emit light even with a negative voltage, a shape formed by folding a sine wave with respect to an X-axis is obtained.

Figure 3A:
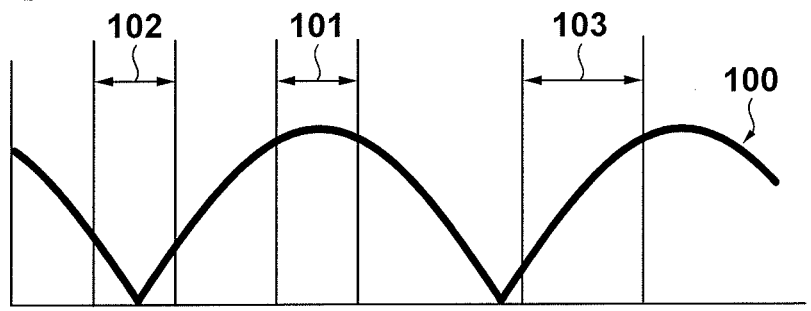
FIGS. 3A to 3D are views showing the waveform of a flicker and images affected by it.

A graph 100 in FIG. 3A shows a light amount generated and accumulated by a photodiode of each pixel in the image sensor 211 after shooting the light source in which the flicker is occurring. If a mechanical shutter is used in capturing, a shutter timing shifts between upper portion and lower portion of the screen depending on a moving speed of the shutter. If a rolling shutter which sequentially exposes image capturing regions for each predetermined region is used when capturing a moving image using a CMOS sensor, an accumulation time shifts between the regions. In either case, however, the accumulation result on the sensor is affected by the flicker in the shape similar to the sine wave. Therefore, the graph of FIG. 3A is used for the sake of convenience.

Figure 3B:
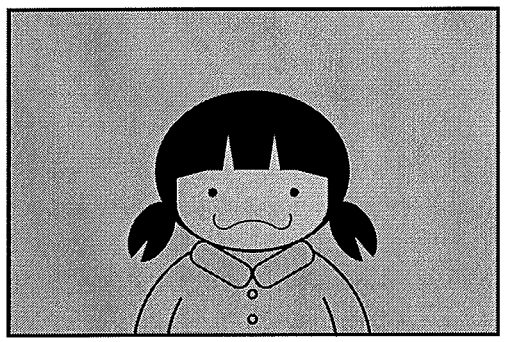
Figure 3C:
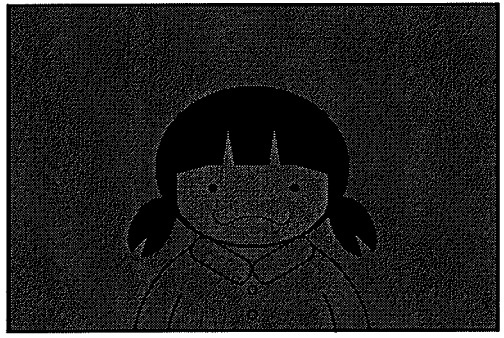

If a still image is shot in a period 101 of FIG. 3A, a part with the brightest light source and a small change can be used, thus making shooting under correct exposure possible as shown in FIG. 3B. If the still image is shot in a period 102 of FIG. 3A, the period with a dark light source will be used. As a result, if shooting is performed with a shutter speed, a stop, and a gain obtained by the same exposure calculation as in FIG. 3B, an object is shot to be dark as shown in FIG. 3C. This is an example of shooting failure caused by the flicker.

Figure 3D:
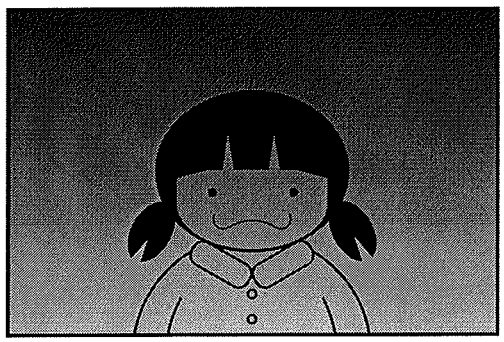

If one frame of the moving image is shot with the rolling shutter in a period 103 of FIG. 3A, the period with a great change in the light source is used. As a result, an image with different exposure between the upper portion and the lower portion as shown in FIG. 3D is shot. This is also an example of shooting failure caused by the flicker.

(Method of Detecting Flicker)

Although a well-known method is used to detect a flicker, an example thereof will be described below. These processes are performed by the system control unit 306.

Figure 4A:
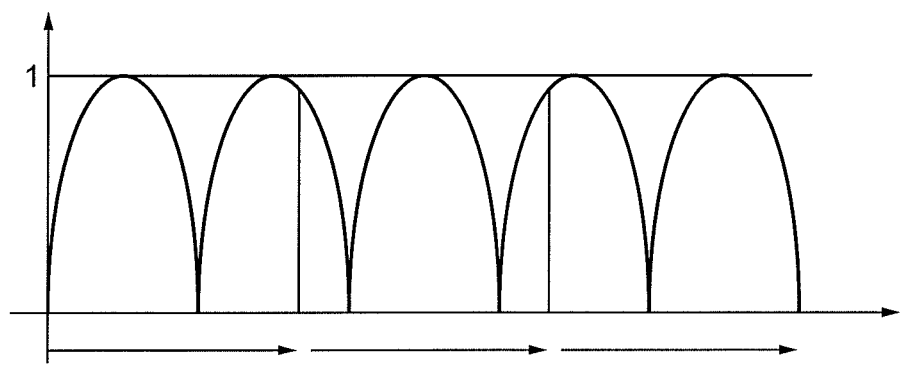
FIGS. 4A and 4B are views showing an example of the flicker and an example of an integrated value for each frame.
Figure 4B:
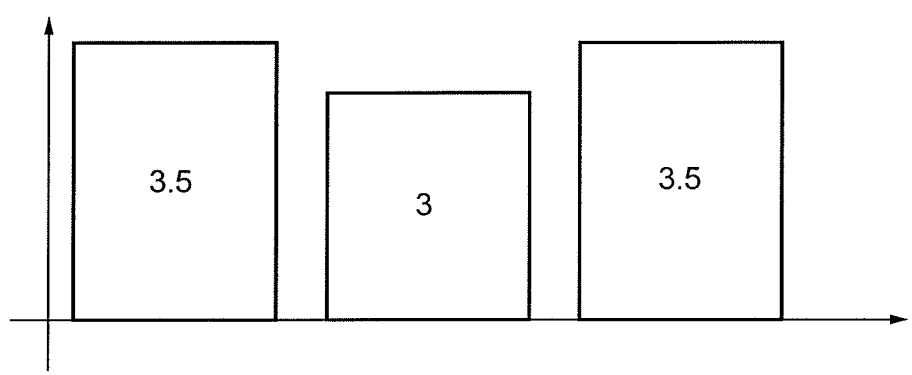

FIG. 4A shows an example of a flicker. A sine wave in the graph shows a state in which a fluorescent lamp is ON at 50-Hz commercial power supply. The fluorescent lamp is turned on in both the positive and negative cycles of an alternating current 100 times per second. Assume that capturing is performed in 60 fields per second, an accumulation time is 1/60 sec, the peak of the sine wave is 1, and 1/50 sec per cycle is $2\pi$, an accumulation amount per field as shown in FIG. 4B is obtained. In a combination of a 100-Hz light source and a 60-Hz recording, a bright field and a dark field are repeated in a 20-Hz cycle.

Hence, in order to detect this, integrated values of a screen luminance of past 10 frames or so and the sum obtained by multiplying a 20-Hz bandpass filter are saved for three fields. If the difference between the integrated values for three fields is equal to or larger than a predetermined value, it can be determined that the flicker is occurring.

The image sensor 211 detects this flicker during live view shooting in which the light beam traveling from the shooting lens 202 is shot with the image sensor 211 by setting the main mirror 203 to the up position or when the configuration without a viewfinder is used.

When the main mirror 203 is set to the down position as shown in FIG. 1 so that the light beam traveling from the shooting lens 202 passes through an optical viewfinder, the photometry sensor 303 included in the AE unit 208 detects the light beam. In this case, there is no need to maintain 60 fields per second as an capturing interval, and accumulation and measurement can be performed in a shorter cycle. This makes it possible to detect the shape of the sine wave of the flicker. This makes it possible to know timings of flicker correction and flicker image creation to be described later.

(Example of Flicker Correction)

Figure 5A:
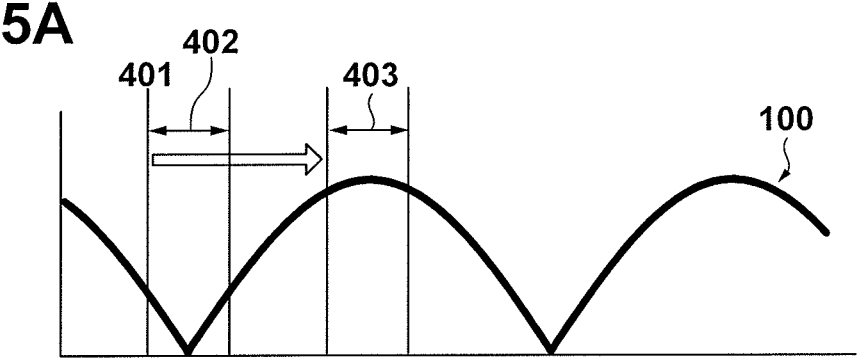
FIGS. 5A to 5D are views showing an image affected by the flicker and an image whose flicker has been corrected.
Figure 5B:
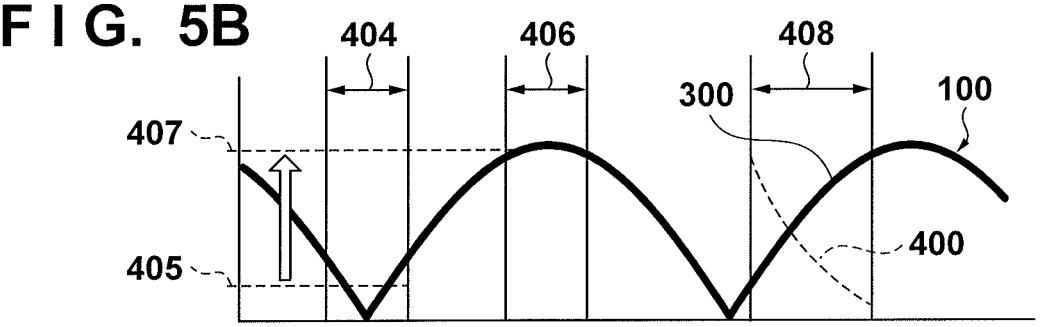

An example of flicker correction in this embodiment will be described with reference to FIGS. 5A to 5D. These processes are performed by the system control unit 306, thereby executing flicker correction. Each of the graphs 100 in FIGS. 5A and 5B shows a light amount on the image sensor 211 which has shot a flicker light source as in FIGS. 3A to 3D. The user shoots a still image with a normal shutter at a timing 401. Therefore, it is assumed that the shooting is started by transmitting the SW2 signal from the operation unit 301. In this case, if a time lag is small enough to be ignored, the image as shown in FIG. 3C which is accumulated in a period 402 is obtained.

Figure 5C:
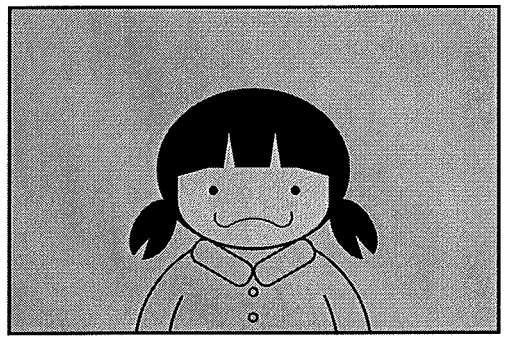

If the flicker light source is detected and the timing of the waveform of the flicker sine wave is known in advance, the start of capturing is postponed to a period 403 in order to avoid the shooting failure caused by the flicker. This makes it possible to avoid the failure as shown in FIG. 5C.

Likewise, in still image shooting with the normal shutter, if the user shoots and obtains the image accumulated in a period 404, an average luminance level 405 within the screen is obtained. The same image as in FIG. 3C is obtained.

If the flicker light source is detected, the luminance level is increased by multiplying the still image by a gain to a level 407 corresponding to a shooting period 406 in order to avoid the shooting failure caused by the flicker. This makes it possible to avoid the failure as shown in FIG. 5C.

Figure 5D:
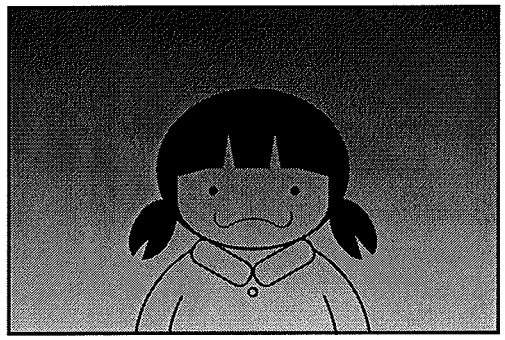

In still image shooting with the rolling shutter, if the user shoots and obtains the image accumulated in a period 408, this leads to the shooting failure such as the image in FIG. 5D with different light amounts between the upper portion and the lower portion of the screen, as described above in reference to FIGS. 3A to 3D. In this case, the failure is caused by a change in the light amount of the light source as shown by a graph 300 in FIG. 5B. It is possible to avoid the failure as shown in FIG. 5C by changing the gain of the image relative to the change in the light amount for each line and multiplying the image by a gain 400.

The aforementioned correction method can be used to shoot the object irradiated with a beam by the light source in which the flicker is occurring. When the shutter timing is shifted to a position in the period 403 as at the timing 401 of FIG. 5A, however, the time lag of the shutter arises as a matter of course, thus worsening a shutter response. For example, when shooting a fast moving object, the user misses a photo opportunity and cannot obtain a desired shot. Moreover, the accumulated image is multiplied by the gain as in the periods 404 and 408 of FIG. 5B, thereby deteriorating an S/N ratio. As a result, the variation in noise between/in the images becomes conspicuous.

(Example of Flicker Image Creation)

In this embodiment, an image (to be referred to as a flicker image hereinafter) affected by the flicker is presented to the user so that he or she can determine whether to execute the flicker correction as described above. A user interface to be described later allows the user to select whether to execute the flicker correction. In this case, the flicker image is created intentionally by a method opposite to the aforementioned correction method to present. The method will be described below. Note that this process is performed by the system control unit 306.

Figure 6A:
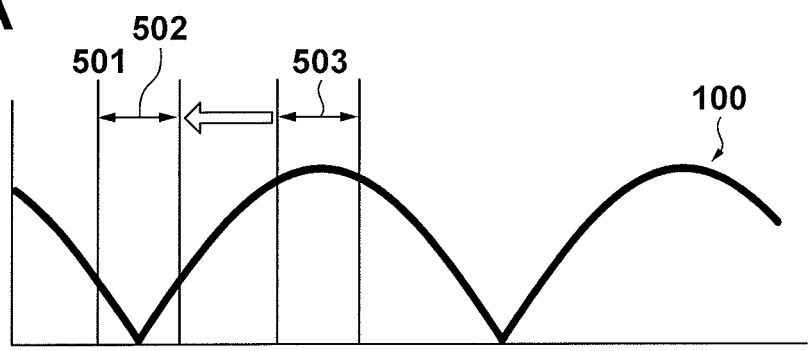
FIGS. 6A to 6D are views showing images when simulating the flicker.
Figure 6B:
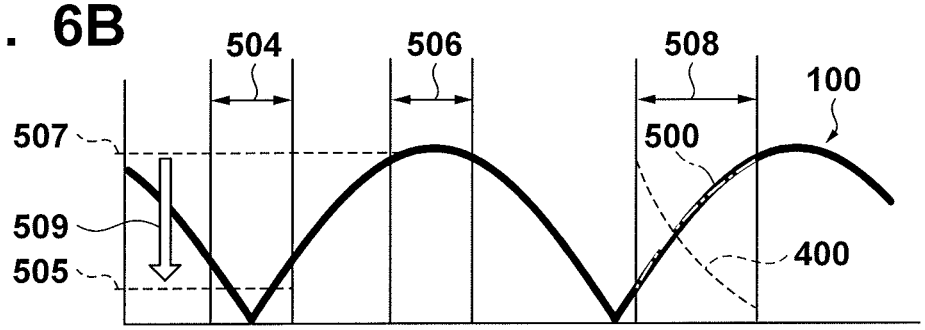

Each of the graphs 100 in FIGS. 6A and 6B shows the light amount on the image sensor 211 which has shot the flicker light source as in FIG. 3A. When the user wants to see the flicker image in which the flicker has occurred and remains without being corrected, a procedure for operating the operation unit 301 to create the flicker image by a method to be described later and display it on the display unit 212 by the same method to be described later is employed.

Figure 6C:
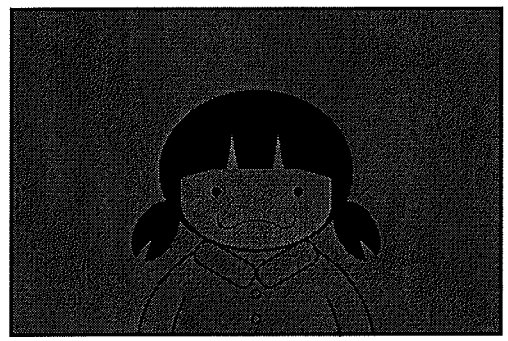

As one method, if a waveform timing of the flicker sine wave is known in advance when the operation unit 301 receives an instruction to see the flicker image, the still image is shot intentionally with the normal shutter in the darkest period 502 (the period in which the flicker is conspicuous) in the light amount change cycle of the flicker. As a result, a flicker image as shown in FIG. 6C is created.

Alternatively, the still image is shot with the normal shutter in a period 506 of FIG. 6B. The still image is multiplied by the gain for intentionally lowering the level from a level 507 in the period 506 to a level 505 in a darkest period 504, as indicated by an arrow 509, thereby creating the flicker image as shown in FIG. 6C.

Figure 6D:
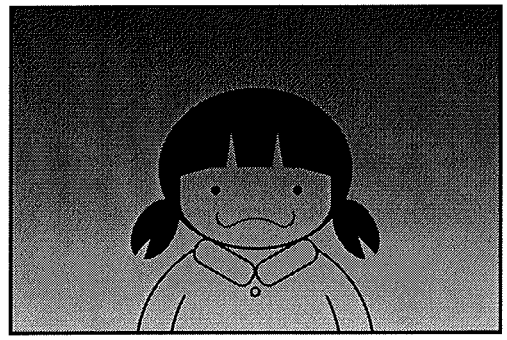

Alternatively, when the still image is shot with the rolling shutter in the period 506 with the small change in the light amount, the still image is multiplied by a gain 500 which is opposite to the gain 400 for each line, thereby creating a flicker image as shown in FIG. 6D.

(Examples of Optical Viewfinder and Live View Display, and Transition to Flicker Screen)

Figure 7A:
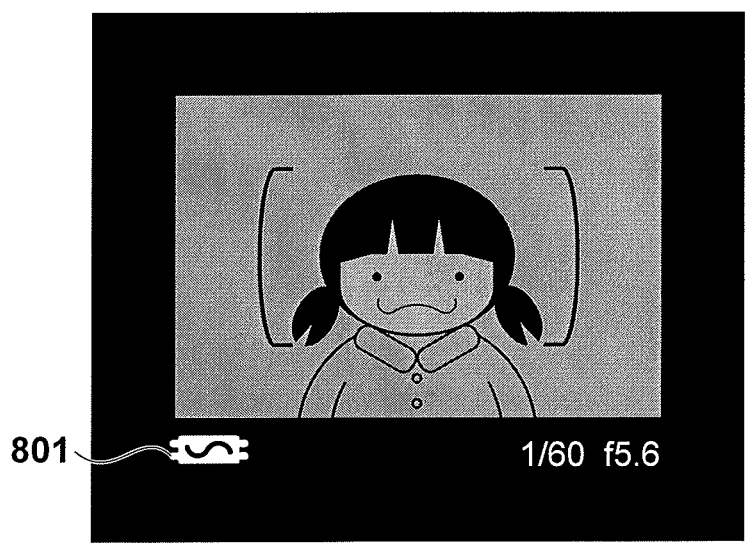
FIGS. 7A and 7B are views showing examples of viewfinder display.

FIG. 7A shows an example of optical viewfinder display of the camera 201. The light traveling from the shooting lens 202 is reflected by the main mirror 203 to be imaged on the mat surface 206, and an icon and information are superimposed on the viewfinder display unit 220. The obtained image is reflected by the pentaprism 207 and the user observes it through the eyepiece 209.

Figure 7B:
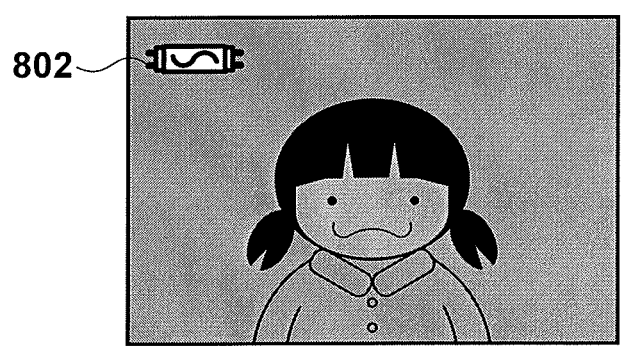

FIG. 7B shows an example of live view display displayed on the display unit 212. An electronic viewfinder generally referred to as a live view is obtained by shooting/performing image processing on the image formed on the image sensor 211 via the shooting lens 202 in a cycle of 1/60 sec by the system control unit 306, and keeping displaying it on the display unit 212.

Assume that the flicker is detected by, for example, the method described above with reference to FIGS. 4A and 4B. In the case of the optical viewfinder of FIG. 7A, the viewfinder display element 220 displays an icon 801 to notify the user that the flicker is occurring. On the other hand, in the case of the live view of FIG. 7B, an icon 802 superimposed on a captured image on the display unit 212 is displayed to notify the user of the flicker occurrence.

When the flicker is thus detected and the icon 801 or 802 is displayed, the operation unit 301 instructs to display the flicker. Then, the flicker image is displayed as in the display example of FIG. 8A.

Figure 8A:
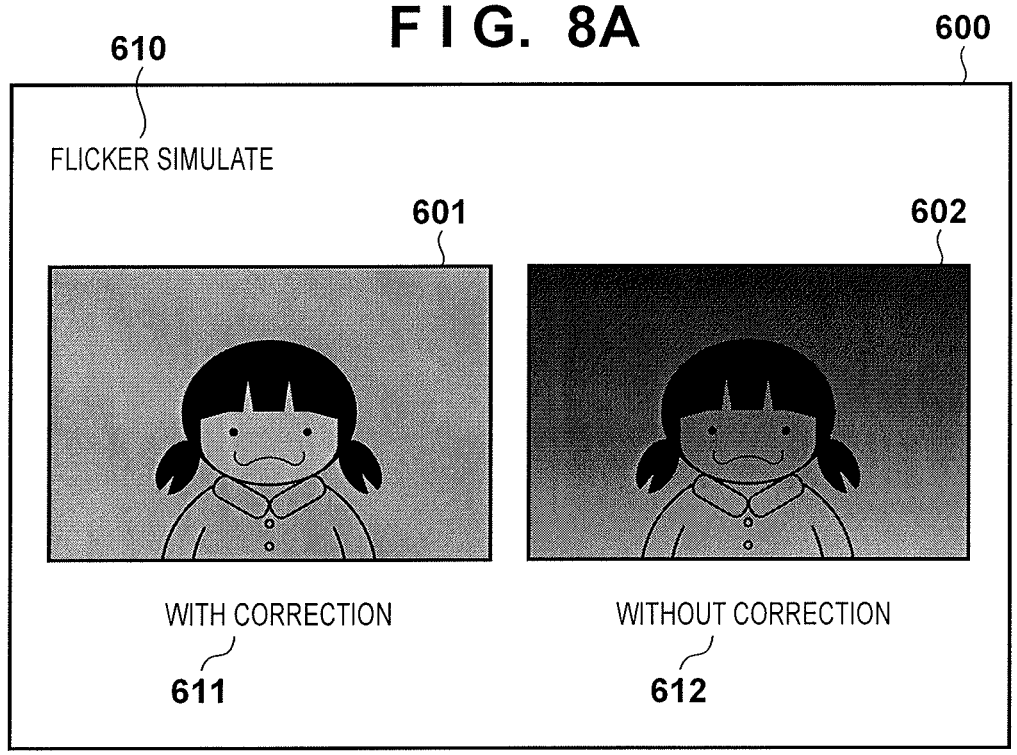
FIGS. 8A to 8C are views showing display examples of a flicker simulation result.
Figure 8B:
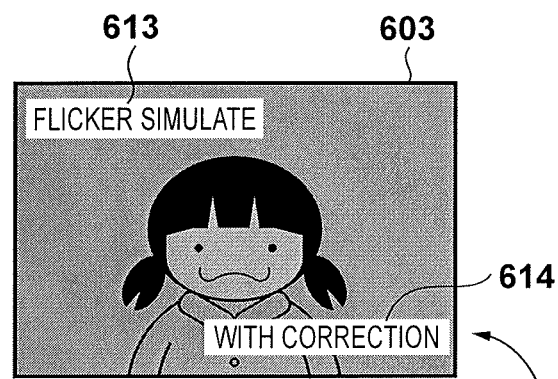
Figure 8C:
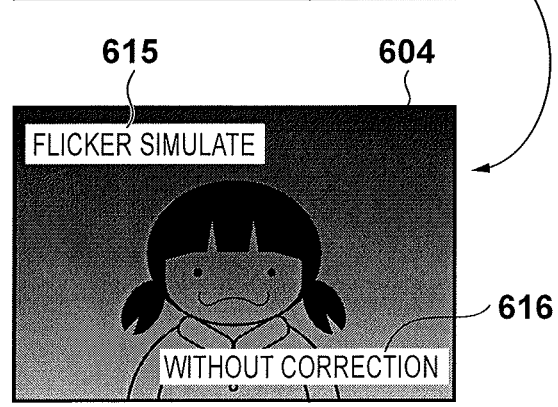

Alternatively, if the operation unit 301 instructs to display the flicker when the flicker is detected and the icon 801 or 802 is displayed, the live view display displays indications of the presence/absence of flicker correction in real time by switching between FIGS. 8B and 8C. FIGS. 8B and 8C may be switched automatically or with a toggle by the operation unit 301.

(Operation Sequence)

FIG. 9 is a flowchart showing the processing sequence of, for example, flicker detection and flicker image display. Live view (denoted as "LV" in FIG. 9) display of the transition examples shown in FIGS. 8A to 8C will be described. When the user turns on the power using the operation unit 301 to set an LV shooting mode, the operation of this sequence begins.

The system control unit 306 determines in step S1001 whether the flicker is detected using the aforementioned method. If the flicker is not detected, normal live view display is performed in step S1002. If the flicker is detected, a process of step S1003 is executed.

The system control unit 306 determines in step S1003 whether a flicker display mode is set. An initial value is a flicker non-display mode. If the flicker display mode is not set, the system control unit 306 controls the display unit 212 to display the flicker icon 802 superimposed on the live view display in step S1004. If the flicker display mode is set, the system control unit 306 controls the display unit 212 to display the flicker image by, for example, the method of FIGS. 8A to 8C in step S1005.

During display in steps S1004 and S1005, the system control unit 306 determines in step S1006 whether a flicker image preview button in the operation unit 301 is pressed. If the button is pressed, the system control unit 306 switches the flicker display mode with a toggle in step S1007. More specifically, the system control unit 306 switches to the flicker non-display mode if the flicker display mode is set; and the flicker display mode, if the flicker non-display mode is set.

After the processes in steps S1002, S1006, and S1007, the system control unit 306 determines in step S1008 whether an SW1 in the operation unit 301 is pressed. If the SW1 is pressed, automatic focus adjustment (AF) and auto exposure control (AE) are performed in step S1009 afterwards. However, the process in step S1009 will not be described in detail because it is similar to that of a known normal camera. If the SW1 is not pressed, the process returns to step S1001.

The system control unit 306 moves to step S1010, and also determines whether an SW2 is pressed. If the SW2 is pressed, the system control unit 306 moves to normal shooting processing. If the SW2 is not pressed, the system control unit 306 repeats step S1009 in which AF and AE are performed, and waits for the SW2 to be pressed in step S1010.

(Example of Flicker Image Display)

As described above, an image resulting from successful shooting under correct exposure and a flicker image affected by the flicker or in a intentionally produced flicker-affected state are prepared. A plurality of images are displayed on one screen in the example of FIG. 8A.

Reference numeral 600 denotes the entire frame of the display unit 212. Two images 601 and 602 are displayed in the frame 600. Reference numeral 610 indicates that a flicker image display mode is in progress. Reference numeral 611 indicates that the image 601 is an image that has undergone flicker correction. Reference numeral 612 indicates that the image 602 is the flicker image that has not undergone flicker correction.

In the example of FIG. 8A, the image 601 which is shot under correct exposure, that is, which has undergone flicker correction, and the flicker image 602 which is affected by the flicker and is not subjected to correction are arranged and displayed side by side. This makes it possible to compare the two images by seeing them simultaneously. However, the problem is that the display size for each image becomes small.

An image 603 is displayed on the display unit 212 in FIG. 8B; and an image 604, in FIG. 8C. The example alternately displays the images of FIGS. 8B and 8C. Each information 613 or 615 indicating that the flicker image display mode is in progress is superimposed on and displayed in the image. Information 614 indicating that the image 603 is an image which has undergone flicker correction is superimposed on and displayed in the image. Information 616 indicating that the image 604 is an image which has not undergone flicker correction is superimposed on and displayed in the image.

In this example, the image 603 is an image which is shot under correct exposure, that is, which has undergone flicker correction, and the image 604 is the flicker image which is affected by the flicker and is not subjected to correction. In this case, it is possible to make full use of the entire screen of the display unit 212 by displaying the two images alternately. However, since the two images are not displayed simultaneously, comparison needs to be done by seeing them alternately.

This allows the user to know a state of the image which has not undergone flicker correction by comparing it with the image which has undergone flicker correction and determine whether flicker correction should be performed.

(Example of User Interface)

Figure 10A:
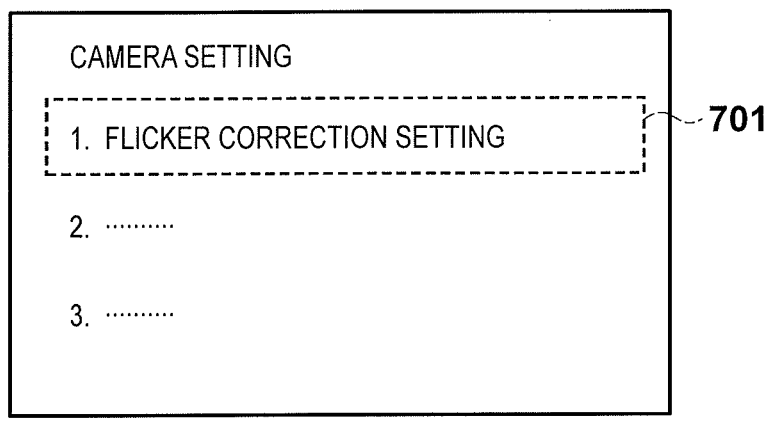
FIGS. 10A and 10B are views showing examples of a user interface.
Figure 10B:
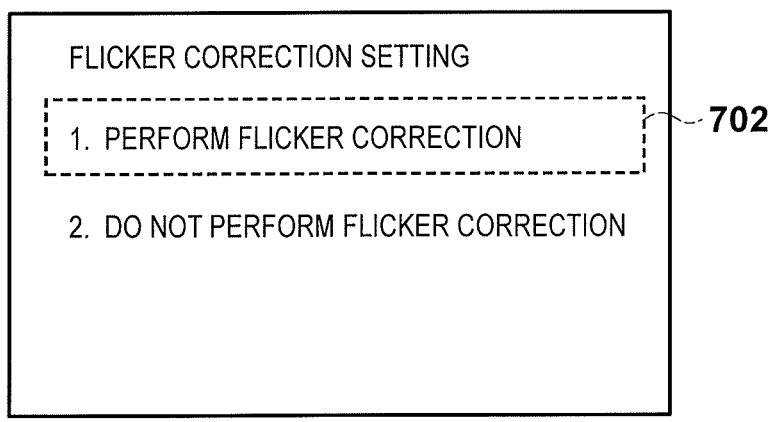

FIGS. 10A and 10B show display examples of a user interface for instructing flicker correction operation in this embodiment. First, during normal shooting operation, a setting mode of the camera 201 enters with, for example, a menu key included in the operation unit 301. In the setting mode, a screen as shown in FIG. 10A is displayed on the display unit 212. A cursor 701 can select items vertically with, for example, a directional key included in the operation unit 301. Likewise, the cursor 701 can confirm the selected item with a confirm key included in the operation unit 301. In this example, the cursor 701 selects and confirms "1. flicker correction setting". Note that this screen includes other setting items required for the camera in "2." and subsequent items.

FIG. 10B shows a screen which is displayed after selecting and confirming "1. flicker correction setting" on the screen of FIG. 10A. The screen is also displayed on the display unit 212. An item regarding whether to perform flicker correction operation described with reference to FIGS. 5A to 5D can be set. There are two items; namely, "1. perform flicker correction" and "2. do not perform flicker correction". A cursor 702 can select and confirm these two items with the key included in the operation unit 301 in the same manner as in FIG. 10A. These two items are stored in a non-volatile memory included in the system control unit 306. This allows the user to instruct the camera 201 to or not to actually perform flicker correction.

Although the preferred embodiment of the present invention has been explained above, the present invention is not limited to this embodiment, and various modifications, changes, and combinations can be made without departing from the spirit and scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-134206, filed Jun. 26, 2013, which is hereby incorporated by reference herein in its entirety.

What is claimed is:

1. An image capturing apparatus comprising:
   an image capturing unit a flicker detection unit configured to detect a flicker;
   a generation unit configured to generate a flicker image which is affected by the flicker or appears to be affected by the flicker based on an image captured by said image capturing unit;
   a display unit configured to display an image;
   a control unit configured to control said display unit to display an image which is not affected by the flicker and the flicker image; and
   an instruction unit configured to instruct to display the flicker image when said flicker detection unit detects the flicker,
   wherein the flicker image is displayed on said display unit in a case that said instruction unit instructs to display the flicker image.

2. The apparatus according to claim 1, wherein said control unit controls said display unit to display that the flicker is occurring when said flicker detection unit detects the flicker.

3. The apparatus according to claim 1, further comprising a correction unit configured to correct the image affected by the flicker,
   wherein said correction unit corrects the image affected by the flicker by delaying an image capturing timing of said image capturing unit in accordance with a light amount change cycle of the flicker.

4. The apparatus according to claim 3, wherein said correction unit corrects an influence of the flicker by one of a method of brightening a dark part caused by the influence of the flicker and a method of darkening a bright part of the image captured by said image capturing unit.

5. The apparatus according to claim 3, further comprising a selection unit configured to cause the user to select whether to perform correction by said correction unit.

6. The apparatus according to claim 1, wherein said generation unit generates the flicker image by one of a method of further darkening the dark part and a method of further brightening the bright part of the image captured by said image capturing unit.

7. The apparatus according to claim 1, wherein said generation unit generates the flicker image by causing said image capturing unit to capture an image at a timing with the most conspicuous flicker.

8. The apparatus according to claim 1, wherein said control unit controls said display unit to display the image which is not affected by the flicker and the flicker image simultaneously.

9. The apparatus according to claim 1, wherein said control unit controls said display unit to display the image which is not affected by the flicker and the flicker image by switching.

10. A method of controlling an image capturing apparatus including an image capturing unit and a display unit comprising:
    detecting a flicker of illumination light which illuminates an object;
    generating a flicker image which is affected by the flicker or appears to be affected by the flicker based on an image captured by the image capturing unit;
    controlling the display unit to display an image which is not affected by the flicker and the flicker image; and
    instructing to display the flicker image when the flicker is detected, wherein the flicker image is displayed on the display unit in a case that there is an instruction to display the flicker image.

11. An image capturing apparatus comprising:
an image capturing unit;
a flicker detection unit configured to detect a flicker;
a generation unit configured to generate a flicker image which is affected by the flicker or appears to be affected by the flicker based on an image captured by said image capturing unit;
a display unit configured to display an image; and
a control unit configured to control said display unit to display an image which is not affected by the flicker and the flicker image,
wherein said generation unit generates the flicker image by one of a method of further darkening the dark part and a method of further brightening the bright part of the image captured by said image capturing unit.

12. An image capturing apparatus comprising:
an image capturing unit;
a flicker detection unit configured to detect a flicker;
a generation unit configured to generate a flicker image which is affected by the flicker or appears to be affected by the flicker based on an image captured by said image capturing unit;
a display unit configured to display an image;
a control unit configured to control said display unit to display an image which is not affected by the flicker and the flicker image; and
a correction unit configured to correct the image affected by the flicker,
wherein said correction unit corrects the image affected by the flicker by delaying an image capturing timing of said image capturing unit in accordance with a light amount change cycle of the flicker, and
wherein said correction unit corrects an influence of the flicker by one of a method of brightening a dark part caused by the influence of the flicker and a method of darkening a bright part of the image captured by said image capturing unit.

13. An image capturing apparatus comprising:
an image capturing unit;
a flicker detection unit configured to detect a flicker;
a generation unit configured to generate a flicker image which is affected by the flicker or appears to be affected by the flicker based on an image captured by said image capturing unit;
a display unit configured to display an image;
a control unit configured to control said display unit to display an image which is not affected by the flicker and the flicker image;
a correction unit configured to correct the image affected by the flicker; and
a selection unit configured to cause a user to select whether to perform correction by said correction unit,
wherein said correction unit corrects the image affected by the flicker by delaying an image capturing timing of said image capturing unit in accordance with a light amount change cycle of the flicker.

14. A method of controlling an image capturing apparatus including an image capturing unit and a display unit, comprising:
detecting a flicker;
generating a flicker image which is affected by the flicker or appears to be affected by the flicker based on an image captured by the image capturing unit; and
controlling the display unit to display an image which is not affected by the flicker and the flicker image,
wherein in the generating, the flicker image is generated by one of a method of further darkening the dark part and a method of further brightening the bright part of the image captured by the image capturing unit.

15. A method of controlling an image capturing apparatus including an image capturing unit and a display unit, comprising:
detecting a flicker;
generating a flicker image which is affected by the flicker or appears to be affected by the flicker based on an image captured by the image capturing unit;
controlling the display unit to display an image which is not affected by the flicker and the flicker image; and
correcting the image affected by the flicker,
wherein in the correcting, the image affected by the flicker is corrected by delaying an image capturing timing of the image capturing unit in accordance with a light amount change cycle of the flicker, and
wherein in the correcting, an influence of the flicker is corrected by one of a method of brightening a dark part caused by the influence of the flicker and a method of darkening a bright part of the image captured by the image capturing unit.

16. A method of controlling an image capturing apparatus including an image capturing unit and a display unit, comprising:
detecting a flicker;
generating a flicker image which is affected by the flicker or appears to be affected by the flicker based on an image captured by the image capturing unit;
controlling the display unit to display an image which is not affected by the flicker and the flicker image;
correcting the image affected by the flicker; and
causing a user to select whether to perform correction in the correcting,
wherein in the correcting, the image affected by the flicker is corrected by delaying an image capturing timing of the image capturing unit in accordance with a light amount change cycle of the flicker.

* * * * *